United States Patent [19]

Kessler et al.

[11] Patent Number: 4,728,965

[45] Date of Patent: Mar. 1, 1988

[54] LASER PRINTER HAVING MEANS FOR CORRECTING LASER POINTING ERRORS

[75] Inventors: David Kessler; Edward J. Muka, both of Rochester, N.Y.

[73] Assignee: Eastman Kodak Company, Rochester, N.Y.

[21] Appl. No.: 876,581

[22] Filed: Jun. 20, 1986

[51] Int. Cl.⁴ .............................................. A01D 9/42
[52] U.S. Cl. .................................... 346/108; 358/296; 350/174
[58] Field of Search ................ 346/108, 107 R, 76 L, 346/160; 358/296, 300, 302; 350/174, 394

[56] References Cited

U.S. PATENT DOCUMENTS

| | | | |
|---|---|---|---|
| 2,909,097 | 10/1959 | Alden et al. | 350/174 |
| 3,464,760 | 9/1969 | Laures | 350/40 |
| 3,974,507 | 8/1976 | Chemelli et al. | 346/76 L |
| 4,283,116 | 8/1981 | Weis | 350/174 |
| 4,581,617 | 4/1986 | Yoshimoto | 346/108 |
| 4,634,232 | 1/1987 | Tateoka | 350/394 |
| 4,637,679 | 1/1987 | Funato | 350/174 |

Primary Examiner—E. A. Goldberg
Assistant Examiner—Mark Reinhart
Attorney, Agent, or Firm—Donald D. Schaper

[57] ABSTRACT

A laser printer is disclosed with three separate channels. Each channel includes a gas laser which projects a beam at a particular wavelength along the channel optical axis. A beam combiner receives the light beams from the three channels and combines them to form a combined beam spot at a registration plane. The combined beam spot is relayed to a polygon which scans the beam onto a receiving medium. In order to minimize laser pointing errors and eliminate artifacts in the image, optical means are provided for adjusting the size of the beam for optimum operation and for making the combined beam spot optically conjugate with a plane in each channel at a preselected point in the channel from which the pointing errors originate.

10 Claims, 3 Drawing Figures

LASER PRINTER HAVING MEANS FOR CORRECTING LASER POINTING ERRORS

BACKGROUND OF THE INVENTION

1. Field of the Invention

This invention relates to a laser printer, and more particularly, to means in such a printer for minimizing laser pointing errors.

2. State of the Prior Art

Laser printers are used in the graphic arts for printing on a receiving medium such as film. When such printers are used as color printers, they generally include a separate channel for each of the primary colors. Each channel has a laser which projects a beam of intense and coherent light at a predetermined wavelength. These beams of light are combined by a beam combiner, and the combined light beam forms a spot that is scanned by a rotating polygon across an image plane. The intensity of the light beam in each channel is modulated in accordance with an electrical signal representing image information. For one type of laser, an acoustooptic modulator can be used to modulate the beam.

There must be precise registration of the three light beams at the image plane in order for a color printer to produce high quality prints. In lasers used in such printers, it has been determined that the laser beam tends to originate from a point in a fixed plane located along the optical axis. This plane is not necessarily aligned with any physical part of the laser; however, the plane is frequently positioned at the exit of the laser. Optical alignment of the laser during manufacture is based on the location of the fixed plane and of the point in the plane where the optical beam exits the plane at some angle to the normal to this plane. The beam usually deviates from this initial alignment after usage due to vibrations, thermal changes and other factors. Thus, pointing errors occur which cause the misalignment of the combined three beams at the image plane. Pointing errors can also cause beam intensity modulation as the beam passes through position sensitive components such as acoustooptical modulators; such modulation may induce artifacts in the image.

U.S. Pat. No. 3,974,507 is directed to a micrographics device for machining holes in a thin film by means of a solid-state junction laser. A lens array is interposed between the output face of the laser and the thin film to correct for astigmatism and an elliptical cross section of the output beam of the laser. However, the lens array disclosed in this patent is not suitable to correct for pointing errors in a laser printer of the type disclosed herein.

SUMMARY OF THE INVENTION

It is an object of the present invention to provide a laser printer which overcomes the problems in the prior art discussed above. The disclosed printer is particularly adapted to combine light beams of different wavelengths to produce a combined beam in which the effects of laser pointing errors are minimized.

In accordance with one aspect of the present invention, there is provided a laser printer having a plurality of optical channels, the printer comprising: means in each channel for projecting a beam of light of a specific wavelength along the channel; means for combining the beams of light to form a combined beam spot at a registration plane; means for projecting the combined beam spot onto a receiving member; and optical means for adjusting the size of the beam in each channel for optimum performance and for making the combined beam spot optically conjugate with a plane in each channel located at a predetermined point in the respective channel.

In one embodiment of the invention, a laser printer includes three optical channels. Each channel includes a gas laser which projects a beam at a particular wavelength along the channel optical axis, and an acoustooptic modulator which modulates the beam in accordance with a video signal. A beam combiner combines the beams from the three channels to form a combined beam spot at a registration plane. The combined beam spot is relayed to a polygon which scans the beam onto a receiving medium. The printer includes optical elements that make optically conjugate the combined beam spot at the image plane with a beam spot in each channel at a point from which laser pointing errors originate.

The optical arrangement of the present invention corrects for pointing errors and also sizes the gaussian laser beam for optimum performance. The beam spots can be precisely registered at the image plane, and thus, the present invention is particularly suitable for use in a laser printer in which two or more optical channels are combined to produce a colored image. The particular techniques used in the disclosed printer for correcting for pointing errors result in a printer that is very stable and can be used over long periods without optical realignment.

DESCRIPTION OF THE PREFERRED EMBODIMENTS

As used herein, the term "conjugate plane" refers to an image plane or an object plane located along an optical axis. The term "beam spot" refers to the cross section of a light beam in a plane perpendicular to an optical axis. The term "scan direction" refers to the direction of movement of the scanning beam across the receiving medium, and the term "cross-scan direction" refers to the direction of movement of the receiving medium relative to the scanning beam.

Figure 1:
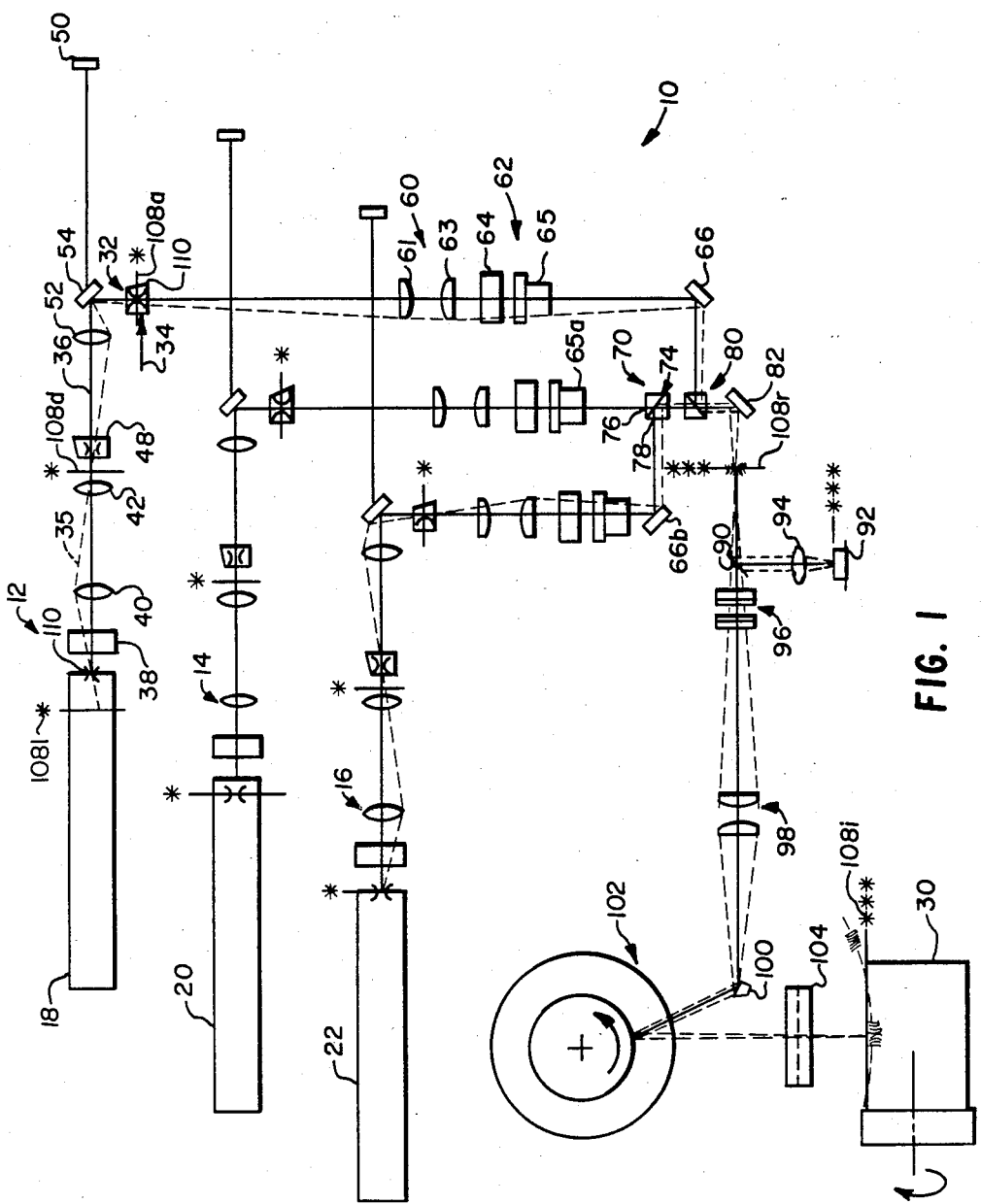
FIG. 1 is a plan view in schematic form of the laser printer of the present invention.

With reference to FIG. 1, there is shown a laser printer 10 constructed in accordance with the invention. Printer 10 comprises three separate optical channels, 12, 14, and 16. Channel 12 includes an argon ion (AR+) laser 18 which produces blue light having a single major spectral line at a specific wavelength, for example 476.2 nm. A helium-neon laser 20 in channel 14 produces red light at a wavelength of 632.8 nm. A laser 22 in channel 16, also an argon ion laser, produces green light at a wavelength, for example, 514.5 nm. Each of the three lasers 18, 20, 22 produces a gaussian laser beam having a circular symmetrical cross section which is used to expose a photosensitive receiving member 30 located at an image plane 108i.

As shown in FIG. 1, the optical elements in each of the channels 12, 14, and 16 are generally the same, and thus, the functioning of these elements will be described with respect to channel 12, it being understood that corresponding elements in the channels 14 and 16 function in the same manner. An acoustooptic modulator 32 is provided in channel 12 to modulate the channel light beam in accordance with a video signal indicated by arrow 34 (FIG. 1). Modulator 32 is of a well known type and may include a transparent cell which can be made of glass or $TeO_2$ crystal.

The beam from laser 18 is relayed to acoustooptic modulator 32 along an optical axis 36. As will be discussed in more detail hereinafter, pointing errors can occur in the laser beam (frequently at the exit of laser 18), and a dashed line 35 has been used to show diagrammatically the deviation of the beam of the optical axis 36. As the beam leaves laser 18, it first passes through a shutter 38 and then through a pair of positive lenses 40, 42 which direct the beam to an acoustooptic modulator 48. Modulator 48 serves in combination with a detector 50 and appropriate circuitry (not shown) as a device for accomplishing noise reduction in the printer 10. A more complete description of such a device can be found in commonly-assigned U.S. patent application Ser. No. 619,453 entitled "Light Beam Intensity Controlling Apparatus" filed June 11, 1984, in the names of Baldwin and Woo.

As the beam leaves modulator 48 it passes through a positive lens 52, and is directed by a beam splitter 54 to modulator 32. The modulated beam from modulator 32 passes through a compound lens 60 having lens elements 61 and 63, through a variable optical attenuator 62 which consists of a half-wave plate 64 and a polarizer 65, and is directed by a folding mirror 66 to a beam combiner 70.

Beam combiner 70 comprises an element 74 which receives a modulated beam from a polarizer 65a in channel 14, and a modulated beam from a folding mirror 66b in channel 16. Element 74 comprises glass prisms 76, 78 which sandwich between them a dichroic filter (not shown). Element 74 relays the green light from channel 16 to a second element 80, and element 74 also passes the red light from channel 14 to element 80. Element 80 passes the beam from element 74 to a folding mirror 82 and also relays the blue beam from channel 12 to mirror 82. Folding mirror 82 projects the combined beam along axis 36, as shown in FIG. 1.

As will be described hereinafter, optical elements in each of the channels 12, 14, and 16, produce an aerial image of the respective channel beam at a registration plane 108r to form a combined beam spot. The waist size of each of the beams at plane 108r can be the same. However, it is preferred that the waist sizes for the three beams be made to scale according to the square root ratio of the wavelengths. Thus, for example, the waist of the red beam (633 nm) is 15.3% larger that the blue waist (476 nm). This ensures that the three laser beams will propagate similarly through the rest of the optical system, and the same ratio of the beam sizes will be preserved at the image plane 108i.

The combined beam spot at registration plane 108r is projected through a beam splitter 90 which directs a portion of the beam to a quadrant detector 92 through a lens 94, and a portion of the beam through cross-scan optics 96 and scan optics 98 to a beam steer mirror 100; mirror 100 directs the beam to a rotatable polygon 102. Polygon 102 is adapted to scan the beam through a predetermined scan angle, as is well known in the art. Polygon 102 directs the beam to a cylindrical mirror 104 which directs the beam to the image plane 108i located at member 30. The mirror 104 optically relays an image of the beam spot on the facet mirror of polygon 102 to the member 30 at all cross-scan angles and at multiple wavelengths, since the beam is actually, at this point, a mixture of red, green and blue colors. The cylindrical mirror 104, which has power only in the cross-scan direction, forms in the cross-scan direction an image of the facet mirror on the member 30. Thus, in the cross-scan direction, the beam spot at the image plane 108i is made optically conjugate with the beam spot at the polygon facet mirror.

An important feature of the present invention is the provision of optical means in each of the channels 12, 14, and 16 which will correct for pointing errors by making the plane from which such errors appear to originate conjugate with the image plane 108i and with other planes where pointing errors should be minimized. Laser waists are also relayed to their proper locations. As shown in FIG. 1, image plane 108i, registration plane 108r, a plane 108a at modulator 32, a plane 108d adjacent to modulator 48 and plane 108l at the exit of laser 18 are all conjugate planes and are indicated by a line and an asterisk (*). Waist planes in channel 12 are indicated by two curved lines and are designated by reference numeral 110.

Pointing errors can originate at laser 18, and thus, the combined beam spot at plane 108r is made optically conjugate with plane 108l adjacent the exit of laser 18. Pointing errors must be minimized at acoustooptical modulator 32 to prevent variations in beam intensity caused by the pointing errors; to accomplish this, conjugate plane 108a is located in modulator 32. The beam waist 110 is also located in modulator 32. Optical elements for placing the conjugate planes and the beam waists in the desired locations have been shown in FIG. 1 and described above. It will be apparent, however, that once the input and output requirements in terms of conjugate planes and waist locations are specified, various optical systems having one or more lenses can be used to obtain the desired locations. Such an optical system, designated by reference numeral 112, is shown diagrammatically in FIG. 2. System 112 has principal planes P and P' and functions between conjugate planes designated by an asterisk. In FIG. 3, there is a shown an optical system in the form of a single lens 59.

With reference to FIG. 3, it can be shown that:

$$W_1 = W_o \left[ 1 + \left( \frac{S_1}{\frac{\pi}{\lambda} W_o^2} \right)^2 \right]^{\frac{1}{2}} \quad (1)$$

$$W_2 = W_o' \left[ 1 + \left( \frac{S_2}{\frac{\pi}{\lambda} W_o'^2} \right)^2 \right]^{\frac{1}{2}} \quad (2)$$

where
  $W_1$ and $W_2$ are the radii of the beam spots at the conjugate planes;
  $\lambda$ is the wavelength of the light (e.g. 476.2 nm);
  $W_o$ and $W_o'$ are the radii of the beam spots at the input and output waists respectively of the lens 59;
  $S_1$ and $S_2$ are the distances from the planes containing the conjugate beam spots to the waists.

The magnification, M, associated with the two conjugate planes can be shown to be equal to the ratio of the beam radii at these planes. Thus, $$M = (W_2/W_1) \quad (3)$$

The total distance (Z) between the two conjugate planes is then given by:

$$Z = \left(\frac{\pi}{\lambda}\right)^2 \frac{(W_1 + W_2)^2}{\frac{S_1}{W_o^2} + \frac{S_2}{W_o'^2}} \quad (4)$$

It should be noted that for both $S_1=0$ and $S_2=0$, a one-lens solution is impossible, and an a focal system is then needed with two lens elements. Using values obtained for Z and M, the focal distance f of lens 59 can be found, as follows:

$$f = Z/\left(2 + M + \frac{1}{M}\right) \quad (5)$$

and the distances $d_1$ and $d_2$ are:

$$d_1 = f\left(1 + \frac{1}{M}\right) \quad (6)$$

$$d_2 = f(1 + M)$$

In a specific illustrative example of applicants' invention, $W_o$ is equal to 0.1 mm, $W_o'$ is equal to 0.2 mm, $S_1$ is equal to 50 mm, $S_2$ is equal to 100 mm, and $\lambda$ is equal to 0.633 micron. Using equations 1 and 2, it is found that $W_1$ is equal to 0.142 mm, and $W_2$ is equal to 0.224 mm. Using (3), we find M equals 1.577 and using (4) we find Z is equal to 439.68 mm. From (5) and (6) we find f is equal to 104.4 mm, $d_1$ is equal to 170.57 mm, and $d_2$ is equal to 269.10 mm.

Figure 2:
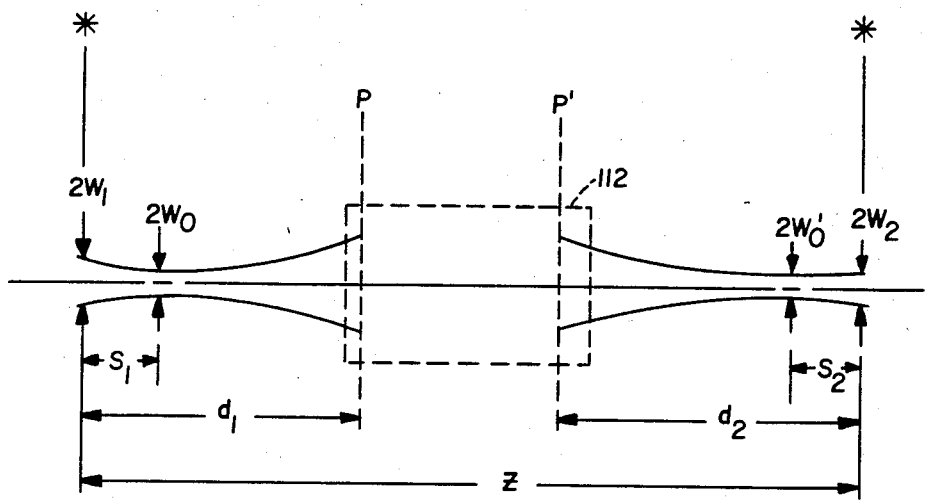
FIG. 2 is a schematic drawing of an optical system for use in the printer of FIG. 1 to correct for pointing errors.
Figure 3:
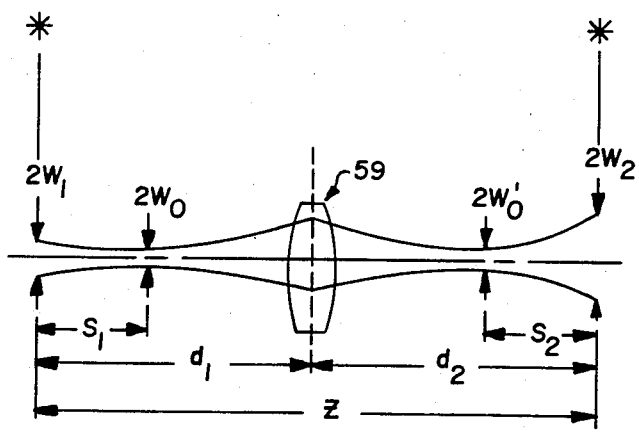
FIG. 3 is shows an optical element for use in correcting for pointing errors.

For an optical system having two lenses, the calculations are generally the same as those discussed above for lens 59 (FIG. 3). However, for a solution involving two lenses, Z is found, as follows:

$$Z = \left(\frac{\pi}{\lambda}\right)^2 \frac{(W_1 + W_2)^2}{\frac{S_1}{W_o^2} + \frac{S_2}{W_o'^2}} + Z_{pp'} \quad (7)$$

where $Z_{pp'}$ is the distance between the principal planes p and p' of the arrangement shown in FIG. 2.

In one illustrative example of an optical system 112 having two lenses, each lens has the same power, and the focal distance of each of the lens is 111.87 mm; the distance between the two elements is 103.86 mm. The distance from one conjugate plane (i.e., the left conjugate plane, as viewed in FIG. 2) to the first lens is 73.82 mm. This arrangement has the same input and output conditions as in the embodiment discussed above (FIG. 3), but the total distance between conjugate planes and is 350 mm.

It is also possible to have three or more lenses for the same input and output conditions, as in the embodiment shown in FIG. 3, and a total distance Z of 350 mm. Such a system can be corrected for manufacturing errors of the lenses or errors in the input parameters by repositioning the elements. In FIG. 1, an optical system having three lenses is shown which includes lenses 40, 42, and 52. In this case, focal distances for lenses 40, 42 and 52 could be 50, 12.35 and 25 mm respectively. The distance between plane 108l and lens 40 is 62.1 mm, between lens 40 and lens 42 is 63.85, between lens 42 and lens 52 if 40.56 mm and between lens 52 and plane 108a is 183.45.

It will be apparent from the foregoing discussion that the present invention is effective in correcting for pointing errors that result from variations in the exit angle of a laser, for example, from laser 18 at plane 108l. Such correction is effected through an optical means which makes plane 108l optically conjugate with planes 108r and 108i as well as plane 108a in modulator 110. The same optical means is configured to properly size the gaussian laser beam in the modulator 32 and at the reference plane 108r to optimize the performance of printer 10.

The invention has been described in detail with particular reference to a preferred embodiment thereof, but it will be understood that variations and modifications can be effected within the spirit and scope of the invention.

We claim:

1. A laser printer having a plurality of optical channels, said printer comprising:
    means in each channel for projecting a beam of light of a specific wavelength along the channel;
    means for combining said beams of light to form a combined beam spot at a registration plane;
    means for projecting said combined beam spot onto a receiving member; and
    optical means for adjusting the size of the beam in each channel for optimum performance and for making said combined beam spot optically conjugate with a plane in each channel located at a predetermined point in the respective channel from which pointing errors can originate.

2. A laser printer, as defined in claim 1, wherein each of said channels includes an acoustooptic modulator and said plane in each channel is located in the modulator in that channel.

3. A laser printer, as defined in claim 1, wherein said means in each channel for projecting a beam of light is a laser, and said plane is located adjacent an exit of said laser.

4. A laser printer having at least two separate optical channels, said printer comprising:
    (a) a laser in each channel which projects a beam of light at a specific wavelength along an optical axis;
    (b) means in each channel for modulating the intensity of the light beam;
    (c) a beam combiner which combines the beams from each channel to form a combined beam spot at a registration plane;
    (d) means for projecting said combined beam spot onto an image plane; and
    (e) optical means for making optically conjugate the combined beam spot at the image plane with a plane in each channel at a position from which beam pointing errors originate, said optical means including lens means in each channel which forms an image of the beam waist within the modulating means.

5. A laser printer, as defined in claim 4, wherein said projecting means comprises scan optics for forming in a scan direction an image of the combined beam spot at the image plane, and cross-scan optics for making in the cross-scan direction the combined beam spot at the registration plane conjugate with the beam spot image at the image plane.

6. A laser printer, as defined in claim 4, wherein waist sizes of said beams at said registration plane are equal.

7. A laser printer, as defined in claim 4, wherein each beam at said registration plane has a waist size which is scaled by the square root of the wavelength of the respective beam.

8. A laser printer, as defined in claim 4, wherein said beam combiner comprises at least two optical elements and a dichroic filter for reflecting the light beam from one channel and transmitting the light beam from another channel.

9. A laser printer having laser means for projecting a modulated beam of light along an optical axis, said printer comprising:
  optical means for forming a beam spot at a first plane, said optical means including means for adjusting the size of the beam for optimum performance and for making said beam spot optically conjugate with a second plane located at a predetermined point on said axis, said beam spot having a radius $W_1$ at said second plane and a radius $W_2$ at said first plane, and $W_1$ and $W_2$ are computed, as follows:

$$W_1 = W_o \left[ 1 + \left( \frac{S_1}{\frac{\pi}{\lambda} W_o^2} \right)^2 \right]^{\frac{1}{2}}, \text{ and}$$

$$W_2 = W_o' \left[ 1 + \left( \frac{S_2}{\frac{\pi}{\lambda} W_o'^2} \right)^2 \right]^{\frac{1}{2}},$$

where
$\lambda$ is the wavelength of said light beam, $W_o$ and $W_o'$ are the radii of the beam spots at the input and output waists respectively of said optical means,
$S_1$ is the distance from said second plane to said input waist, and
$S_2$ is the distance from said first plane to said output waist.

10. A laser printer, as defined in claim 9, wherein the distance Z between said first and second planes is given by:

$$Z = \left( \frac{\pi}{\lambda} \right)^2 \frac{(W_1 + W_2)^2}{\frac{S_1}{W_o^2} + \frac{S_2}{W_o'^2}}.$$

* * * * *